United States Patent [19]

Gustavsson et al.

[11] Patent Number: 4,936,878
[45] Date of Patent: Jun. 26, 1990

[54] METHOD FOR CLEANSING GAS AND APPARATUS HEREFOR

[75] Inventors: Lennart Gustavsson; Leif Lindau; Lars-Erik Johansson, all of Växjö, Sweden

[73] Assignee: Fläkt AB, Nacka, Sweden

[21] Appl. No.: 340,569

[22] PCT Filed: Sep. 17, 1987

[86] PCT No.: PCT/SE87/00420
§ 371 Date: Mar. 17, 1989
§ 102(e) Date: Mar. 17, 1989

[87] PCT Pub. No.: WO88/01901
PCT Pub. Date: Mar. 24, 1988

[30] Foreign Application Priority Data

Sep. 17, 1986 [SE] Sweden ................................. 8603914
Jul. 6, 1987 [SE] Sweden ................................. 8702770

[51] Int. Cl.⁵ .............................................. B01D 47/00
[52] U.S. Cl. ............................................ 55/92; 55/95; 55/255; 55/256; 55/257.4
[58] Field of Search .................. 55/92.95, 255, 256, 55/257.4; 261/77

[56] References Cited

U.S. PATENT DOCUMENTS

| | | | |
|---|---|---|---|
| 404,621 | 6/1889 | Hibbert | 261/124 |
| 924,592 | 6/1909 | Sfeynis | 261/124 |
| 941,676 | 11/1909 | Green | 261/77 |
| 1,421,432 | 7/1922 | Embanks | 261/124 |
| 1,583,141 | 5/1926 | Greenawalt | 261/124 |
| 2,289,953 | 7/1942 | Aldridge | 261/77 |
| 2,715,521 | 8/1955 | Tatibana | 261/177 |
| 3,216,181 | 11/1965 | Carpenter et al. | 55/256 |
| 3,520,113 | 7/1979 | Stokes | 55/223 |
| 4,182,617 | 1/1980 | Al-Saidi | 55/256 |

FOREIGN PATENT DOCUMENTS

| | | |
|---|---|---|
| 228733 | 7/1909 | Fed. Rep. of Germany . |
| 2431574 | 3/1983 | Fed. Rep. of Germany . |
| 14173 | of 1912 | United Kingdom ................ 261/77 |

Primary Examiner—Bernard Nozick
Attorney, Agent, or Firm—Dann, Dorfman, Herrell and Skillman

[57] ABSTRACT

Method for cleansing gas from solid, liquid and/or gaseous contaminants, by bubbling the gas through a liquid bath (32), and by introducing the incoming gas into a distribution means (14) and causing the gas to pass in part-streams through a multiple of inlet orifices (64) located at progressively increasing depths beneath the surface (34) of the liquid (32). With increasing inlet pressure an increasing number of inlet orifices (64) are utilized for an increasing number of part-streams. The gas flow is passed from respective inlet orifices (64) through connecting means (24, 26, 28) to outlet orifices (31) located at a considerably higher height level (h) than corresponding inlet orifices (64). The gas flow is caused to flow out through venturi nozzles (28) and/or to strike against impinger or striking surfaces (39) with a minimum pressure drop corresponding to said height differential (h). In this way full operational pressure is immediately achieved, as soon as gas is passed out through any of the inlet orifices (64), and an intense mixing of gas and liquid as well as a high cleansing efficiency are guaranteed.

13 Claims, 6 Drawing Sheets

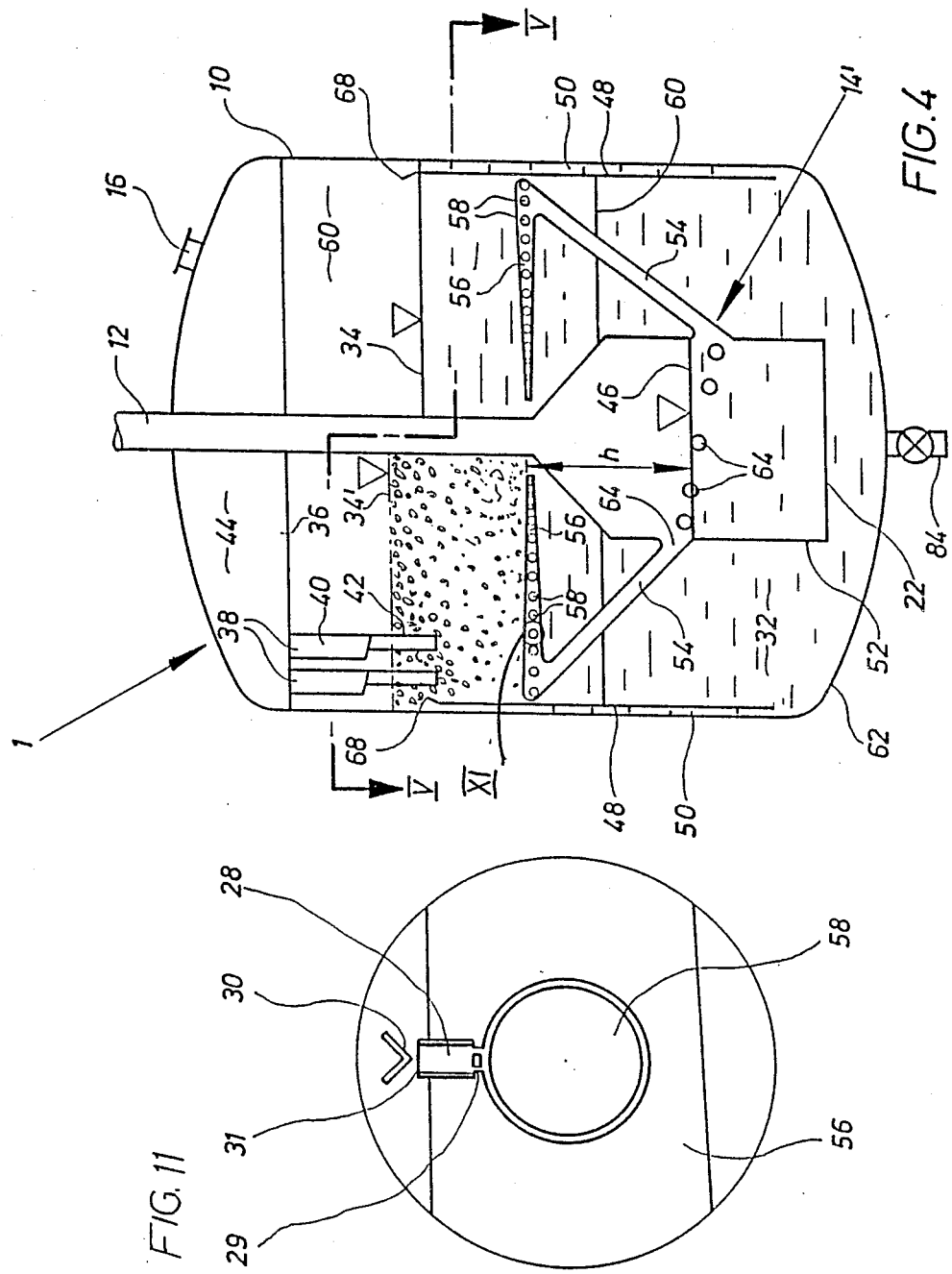

METHOD FOR CLEANSING GAS AND APPARATUS HEREFOR

The present invention relates to a method for cleansing gases from solid, liquid and/or gaseous impurities. The invention also relates to apparatus for carrying out the method.

The invention is particularly intended for use as a passive emergency system capable of being activated in the event of an accident or in the event of interruptions in operations in, for example, nuclear power plants, chemical industries or other industries where such circumstances may result in the release of airborne contaminants dangerous to the health The invention, however, can also be applied under normal operating conditions, for instance, in a plant or manufacturing process.

The invention, both with regard to function and construction, has been developed in response to the very special requirements placed on an emergency safety system. Such a system shall be capable of standing in permanent readiness for a period of at least ten years, and must be capable of instant activation to full effect in the event of an emergency. It is highly beneficial if the emergency system is able to function automatically and independently, in the absence of operating personnel and power input.

Very specific requirements are placed on emergency systems for nuclear power stations and intended for extracting radioactive particles and gases from substances that are released as a result of a breakdown in operation. The following conditions are examples of those conditions which can be required of such an emergency system:

no electric power supply no active control and monitoring by operating personnel long endurance in the absence of power input total endurance for several days capable of absorbing gas and extracting dust particles high degree of efficiency within widely varying rates of flow.

These requirements are fulfilled with a safety system that comprises a very large stone-bed filter. In this case, dust is extracted through physical phenomenon, sedimentation and diffusion, wherewith particles but have a size in the order of 0.5–10 $\mu$m are only slightly affected. Such a filter is consequently relatively large and considerably expensive. Despite this, such filters have poor extraction efficiency with regard to the very finest particles, particularly in regard of particles beneath 0.5 micron. The filter also has poor efficiency with regard to gas separation, the gas in this case being adsorbed on the stone material Distinct from such known filters, the present invention proposes the use of wet cleansing apparatus, using a liquid into which the contaminated gas is guided to a location beneath the surface of said liquid. The separator or filter will then function as a water seal which when no overpressure prevails in the space or chamber connected to the gas cleanser, holds said space isolated from the surrounding atmosphere.

In order for wet cleansing apparatus to be efficient, it is necessary for the liquid and gas to be thoroughly mixed together in the apparatus. Thus, the cleansing liquid must be dispersed throughout the gas in the form of fine liquid droplets and/or the gas must be passed through the liquid in the form of small gas bubbles.

Furthermore, the cleansing efficiency of wet cleansing apparatus into which the gas is introduced beneath the surface of the liquid bath is highly dependent on the rate of flow, and a good cleansing effect is only obtained within a relatively narrow flow range. This presents particular problems in some cases, since an emergency system must be capable of dealing with flow rates of varying magnitudes, without needing to be monitored or controlled actively. There is proposed in DE-PS- 228 733 a cleansing system in which the incoming gas flow is divided into a plurality of part flows which are directed in fine jets against impingement or striking surfaces. This system, however, has the aforesaid drawback of having low efficiency at small rates of flow, since in this latter case the gas bubbles through the liquid in relatively large bubbles and is relatively unaffected.

US-A-3 216 181 (c.f.FIG. 4), US-A 3 520 113 (c.f. FIG. 7) and US-A 4 182 617 (c.f. FIG. 2) teach wet cleansing systems in which the gas is introduced beneath the surface of a liquid bath through a plurality of apertures located at progressively deeper depths. In use, the incoming gas forces down the level of liquid in the inlet conduit with increasing gas flow rates and inlet pressures, until the first outlet aperture is exposed and the gas is able to flow up through the liquid. As the gas flow rate and inlet pressure increase, the liquid surface is pressed down progressively still further, so as to expose more and more of the outlet apertures, such that gas is able to flow therefrom in the form of part gas-flows. In this way at least substantially all flow will pass through the outlet apertures utilized, irrespective of the inlet pressure and the total flow through the gas cleansing system One drawback with such known gas cleansing systems is that when the surface of the liquid in the inlet conduit is pressed down beneath an inlet aperture, the gas will be forced out into the cleansing bath at a low energy level and in the absence of pressure drop. The gas will therefore stream out and up through the liquid in the form of relatively large bubbles, resulting in relatively poor separation of fine particles and gaseous contaminants. Such known cleansing systems are therefore not totally satisfactory as passive emergency systems intended for separating highly toxic particles from contaminated gas flows in, e.g., the event of an accident in a nuclear power plant. Consequently an object of the present invention is to alleviate the drawbacks of the prior art techniques and to provide a method for cleansing gases of the aforesaid kind which will enable particulate contaminants, and particularly the finest particles thereof, to be extracted efficiently, which will also enable gaseous contaminants to be extracted, and which can be applied without requiring the supply of power from external power sources The extent to which contaminant separation is achieved shall be substantially independent of the rate of gas flow. A further object of the invention is to provide for the purpose of carrying out the method apparatus of simple construction, apparatus which can be produced at low manufacturing costs, and apparatus which will operate without requiring the provision of active mechanical components and without the active assistance of personnel. It shall also be possible to decontaminate the apparatus after use.

When practising the method according to the invention and using the inventive apparatus, high cleansing efficiency is constantly achieved irrespective of the magnitude of the total gas flow. Because the contaminated gas is caused to pass through first inlet orifices located at progressively increasing depths beneath the surface of the liquid and then through outlet orifices located at considerable heights above corresponding inlet orifices, it is guaranteed that the contaminated gas will constantly pass through the outlet nozzle at a considerable drop in pressure corresponding to the difference in the height between inlet orifice and outlet orifice. In this way the gas passing through the last of the outlet orifices utilized will also be subjected to a considerable drop in pressure and will therewith be cleansed effectively. Since the distributor means opens freely towards the liquid bath beneath its lowermost inlet orifice, the liquid is able to rise up into the distributor means at decreased inlet pressure (=ceasing emergency conditions), such that the liquid again will rise above some or all of the previously open inlet orifices and close off these openings.

According to one particularly advantageous embodiment of the invention the outlet nozzles are in the form of venturi nozzles having walls which present suction openings to the surrounding liquid bath. This obviates the need of providing separate cleansing liquid inlet pipes and guarantees a constant and positive supply of liquid to the venturi nozzles.

By means of the present invention it is possible to separate particles and liquid droplets by absorption with high efficiency over a wide range of magnitudes. Gaseous contaminants are separated by being dissolved in the washing liquid and/or by reaction with substances incorporated in the liquid.

In accordance with the invention, the pressure of the gas in a containment or containing structure subsequent to a breakdown in operation is utilized effectively to propel the gas through the gas cleansing apparatus. This enables the apparatus to operate fully independently of external power sources.

The inventive cleansing apparatus can also be used as a separator means in process industry. In this respect the cleansing apparatus may be combined with an upstream fan or corresponding device when the overpressure of the contaminated gas is excessively low. This combination can also be applied when the cleansing apparatus according to the invention is intended for use in such breakdown situations as those in which no overpressure is found or occurs.

In order to enable the outer wall of the gas cleansing apparatus to withstand the pressures generated, the wall is conveniently constructed as a pressure vessel.

Guiding partition walls conveniently ensure that there is formed a reflow channel from the proximity of the surface of the liquid to a location beneath the outlet orifices for contaminated gas. The rising bubbles therewith act as an airlift, and cause the liquid to circulate. This counteracts local depletion or consumption of cleansing additives in the washing liquid and also provides a cooling effect, since the bottom liquid also communicates with non-activated parts of the separator.

The invention will now be described in more detail with reference to a non-limiting exemplifying embodiment thereof and with reference to the accompanying drawings. In the drawings, which are schematic and, in part, partial views, FIG. 1 is a vertical sectional view of a first gas cleansing apparatus according to the invention;

FIG. 4 is a vertical sectional view of a second embodiment of a gas cleansing apparatus according to the invention

FIG. 11 is an enlargement of the area encircled at XI in FIG. 4.

Figure 1:
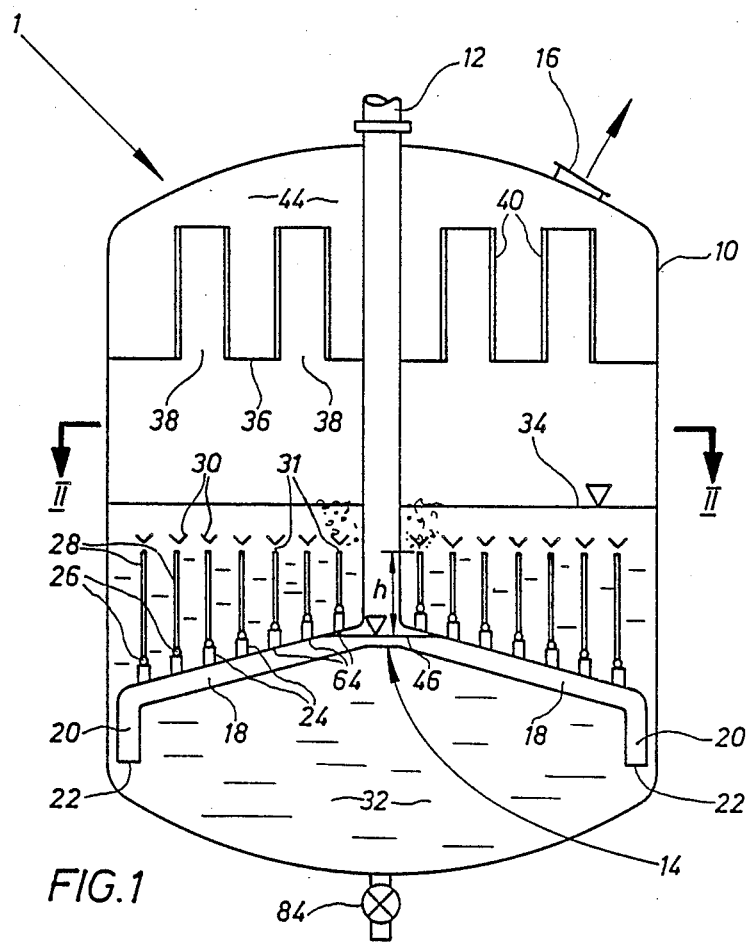
Figure 2:
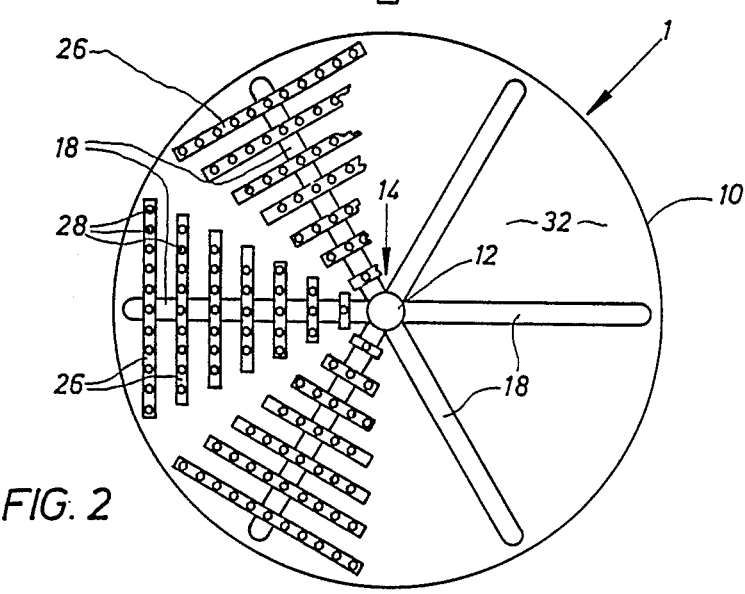
FIG. 2 is a horizontal sectional view taken on the line II—II in FIG. 1.
Figure 3:
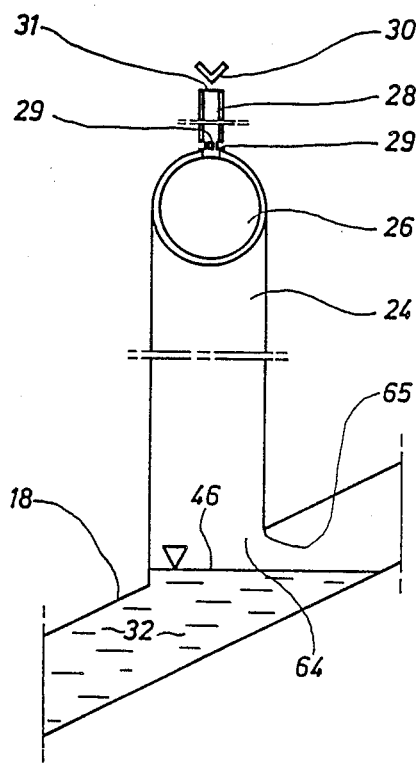
FIG. 3 is a detail view of FIG. 1, illustrating an outlet orifice in co-action with an opposing impingement or striking surface.

FIGS. 1-3 illustrate highly schematically a gas cleansing apparatus which comprises a pressure vessel 1, consisting of an outer wall 10, a bottom 11 and a cover or lid 13; and further comprising an inlet 12, a distributor means 14 and an outlet 16.

The distributor means comprises a plurality of radially and obliquely downwardly extending distribution pipes 18, the illustrated embodiment having six such pipes. The distribution pipes have an outer vertically and downwardly extending pipe section 20 having a downwardly facing, free opening 22. The distribution pipes 18 have arranged on their respective obliquely extending parts riser pipes 24 which are connected to transversely extending distribution pipes 26. As will best be seen from FIG. 3, the distribution pipes 26 have provided thereon contaminated-gas outlet nozzles 28 provided with outlet orifices 31. The outlet nozzles, of which only two are shown in FIG. 2, may conveniently have the form of venturi nozzles, which are preferably provided with suction orifices 29 intended for washing or cleansing liquid and facing the surrounding liquid bath 32. Arranged above the outlet nozzles are respective dispersing devices in the form of impingement or striking surfaces comprising angle iron 30 carried by a supporting structure not shown.

The distributing means 14 is lowered into a liquid bath 32 to a given depth beneath the surface 34 of the bath, and in accordance with one preferred embodiment the outlet nozzle 28 has the form of a venturi nozzle. The majority of the outlet orifices 31 of the venturi nozzles 28 are preferably all located on the same level, preferably at a distance of at least approximately 0.5 m, from the surface of the liquid, preferably 2 m. The inlet orifices 64 for contaminated gas for respective venturi nozzles 28 are, in turn, located approximately 1 m or further beneath the outlet orifices 31. As a result of this height differential there is constantly achieved a satisfactory cleansing effect with each venturi nozzle, as soon as contaminated gas enters through the downwardly located inlet orifice 64 of said nozzle. The contaminants are isolated during passage through the venturi tube with the aid of liquid drawn by suction through the suction openings 29, this liquid being entrained in droplet form by the gas. These contaminant-laden liquid droplets are, in turn, separated from the gas, partly in the form of a liquid film on the inner surface of the pipe 49 and partly during passage between the outlet orifices 31 and the liquid surface 34. With regard to droplet separation during passage through liquid, a given smallest height differential is required in order to provide satisfactory separation.

The invention is not restricted, however, to outlet nozzles in the form of venturi nozzles, but also includes the use of preferably fine outlet pipes directed towards the respective impingement or striking surfaces, so as to atomize the gas into fine bubbles which pass up through the liquid bath.

The height of the bath above the outlet orifices 31 should be such as to expose the bubbles to the liquid for a sufficient length of time. This applies particularly in this latter embodiment.

A substantially horizontal intermediate bottom 36 is arranged between the surface 34 of the liquid and the outlet 16. The intermediate bottom 36 has provided therein a plurality of through-passing openings 38 with separating means 40 for separating fine liquid droplets and possibly particles, said means being shown purely schematically. These separating means may, in principle, be of any desired kind. Cyclone devices, however, are particularly preferred. As illustrated in FIG. 4, separated liquid can therewith be brought down beneath the liquid surface 34, via an extension pipe 42. The extension pipe 42 may be shielded against direct ingress of gas bubbles by means, e.g., of a hood (not shown). Further separating means for separating particles and liquid droplets may be arranged in a manner known per se in the space 44, above the intermediate wall 36 and upstream of the outlet 16. The outlet 16 may, in turn, be connected to a further cleansing arrangement or may pass directly to a smoke stack or some other discharge device.

The gas cleansing apparatus operates in the following manner. In an unloaded state, washing liquid enters through the orifices 29,31 of the outlet nozzles 28 (shown in enlarged detail in FIGS. 3 and 11) and the lower openings 22, such that an inner liquid surface 46 in the distributing means 14 and the inlet pipe 12 adopt the same position as the surface 34 of the surrounding liquid bath. The gas cleanser now has a water seal function. In the event of a breakdown or accident in which gas is released, the pressure increases and the inner liquid surface 46 is pressed down until it reaches beneath a threshold 65 at the level of the highest most inlet orifice or orifices 64 of respective outlet nozzles 28. Gas will now exit through these outlet nozzles and will draw finely divided liquid droplets into the gas stream during its passage past the suction openings 29. Solid and liquid contaminants together with contaminated gases are absorbed by the liquid droplets sucked into the nozzles. The exiting gas impinges on the impinger or striking surface 30, and is therewith broken down into fine gas bubbles, which rise up through the washing liquid 32. The gas is cleansed further through a washing-bottle effect, the now contaminant-laden liquid droplets, dust particles and gaseous contaminants being taken up by the washing liquid. A certain proportion of the droplets are separated in the upper part 49 of the nozzle 28 and settle as a film on the inner surface of said upper part.

Thus, the separation or extraction of contaminants takes place in two stages. In a first stage dust extraction and the absorption of gases and ions takes place through a venturi and/or impinger effect through inertia forces in and adjacent the outlet nozzles 28 and the impinger or striking surfaces 30. In a second separation stage, the extraction of dust and absorption of gases takes place through a washing-bottle effect, i.e. absorption, sedimentation and/or diffusion during passage of the gas bubbles through the washing liquid up to the surface 34 of the liquid bath.

Separation of gaseous contaminants can be greatly enhanced by incorporating in the washing liquid substances which cause chemical reactions to rapidly consume, i.e. react with, ions dissolved in the liquid(so-called chemical amplification). For instance, the separation of acid gaseous components can be improved by dissolving alkaline components in the liquid. Absorption of gaseous iodine can be facilitated by mixing sodium thiosulphate with the washing liquid.

As will be understood from the aforegoing and seen from FIGS. 1-3, all nozzles 28 on one and the same riser pipe 24 of this embodiment will begin to operate substantially simultaneously. The riser pipes 24 on different main pipes 18 may be located on mutually displaced levels, so that not all riser pipes incorporated in one and the same pipe ring will begin to operate at one and the same time.

Figure 7:
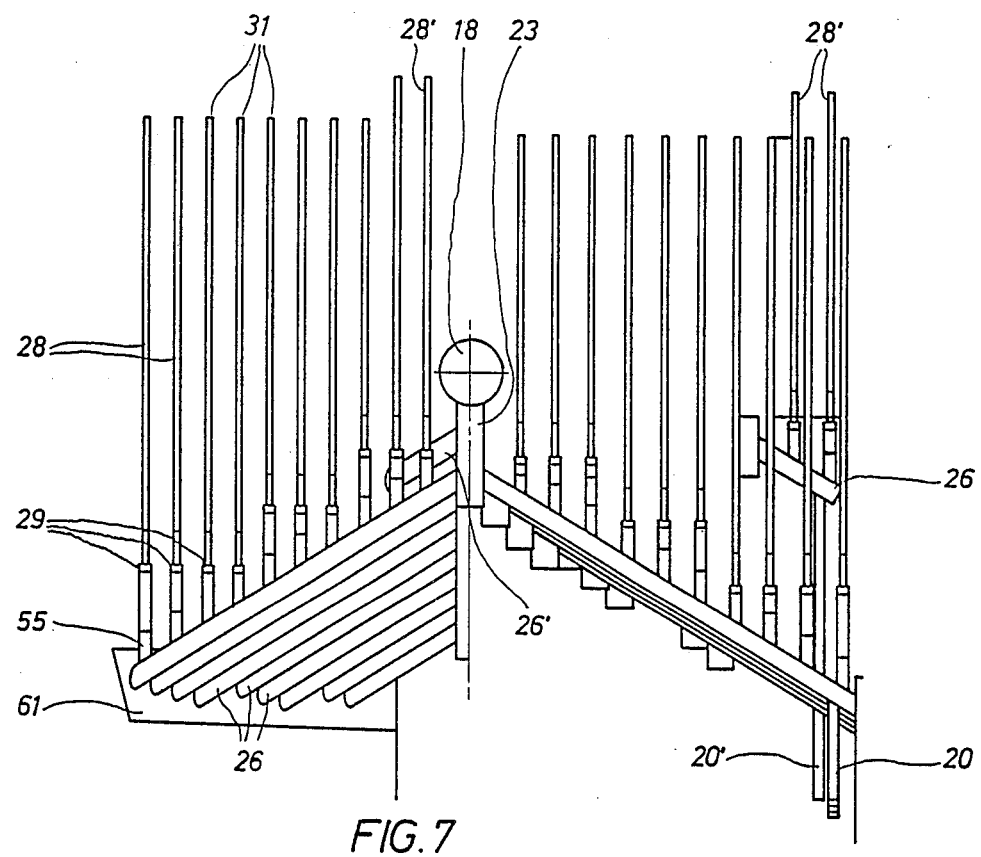
FIGS. 7-9 are mutually different views of a third embodiment of the invention.
Figures 8, 9:
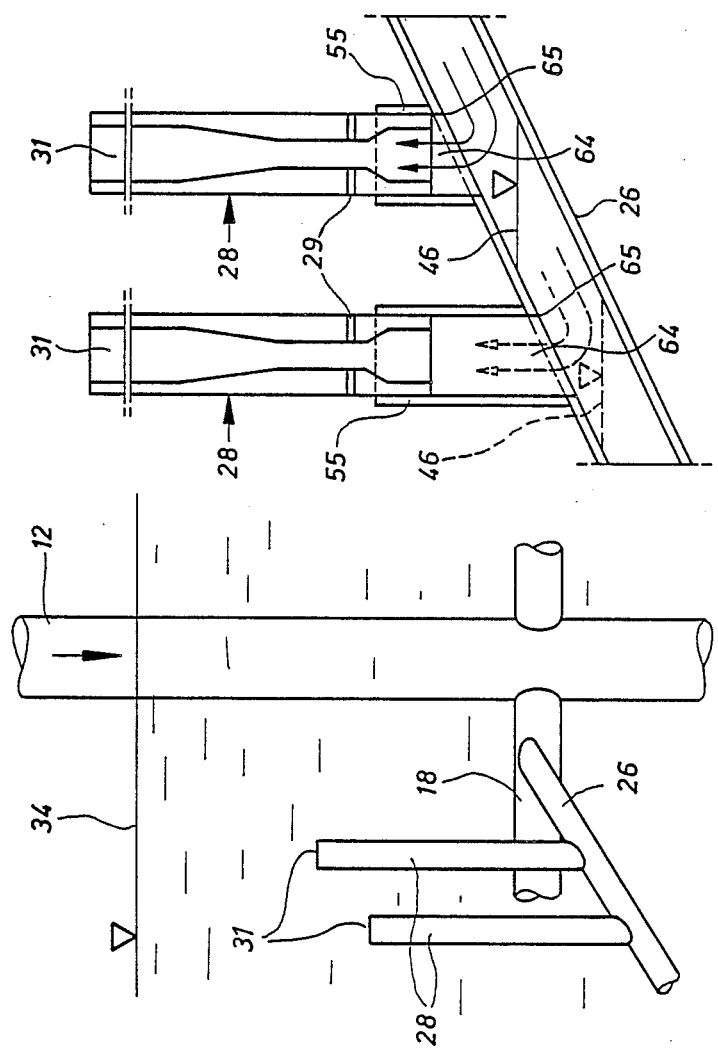

FIGS. 7-9 illustrate various examples of alternative embodiments of the distributing means 14, in which each inlet orifice 64 is connected with a single outlet orifice 31. FIG. 7 illustrates in section part of a distributing means having a main distributing pipe 18. The pipe 18 is provided with downwardly extending connecting pipes 23, each having two obliquely and downwardly, approximately transversely extending distribution or side pipes 26. The side pipes 26 are provided at their free ends with a downwardly extending, vertical pipe section 20 having a free opening 22. Similar to the preceding embodiment, any condensation formed is able to pass out through the openings 22, while washing or cleansing liquid is able to pass up into the distributing means 14 when the rate of gas flow decreases. Arranged in approximately uniform spaced relationship on the distribution pipes 26 are a plurality of vertically and upwardly extending venturi nozzles 28 having inlet orifices 64 which face the distribution pipes. The venturi nozzles 28 are provided at their lower ends with suction openings 29 for washing liquid, and at the top thereof with outlet orifices 31 for processed gas. In order to obtain smooth starting conditions in the absence of shock loads at the initial stage of gas release through the gas cleansing apparatus, each section has two highly located, short side pipes 26' which discharge at locations above the remaining nozzles. The downwardly depending pipe sections 20' of the side pipes 26', however, extend down to the same level as remaining pipe sections 20. The distributors are also constructed such that the orifices 64 of the venturi arrangements 28 lie at progressively increasing depths on an increasing number of distribution or side pipes 26, so that the number of active separators increases continuously with accelerating speeds with increasing gas flow and inlet pressure.

FIG. 8 illustrates an embodiment which differs slightly from the embodiment of FIG. 7 and in which side pipes 26 pass directly from the main distributing pipes 18, in the absence of intermediate, vertical connecting pipes 23.

FIG. 9 is a sectional view in larger scale of a side pipe 26 having in its upwardly facing surface inlet orifices 64 and vertically upstanding connecting pipes 55 for accommodating venturi nozzles 28. In the FIG. 9 embodiment a further outlet nozzle becomes operative or active when the internal water surface 46 moves to the level referenced 46'.

Figure 10:
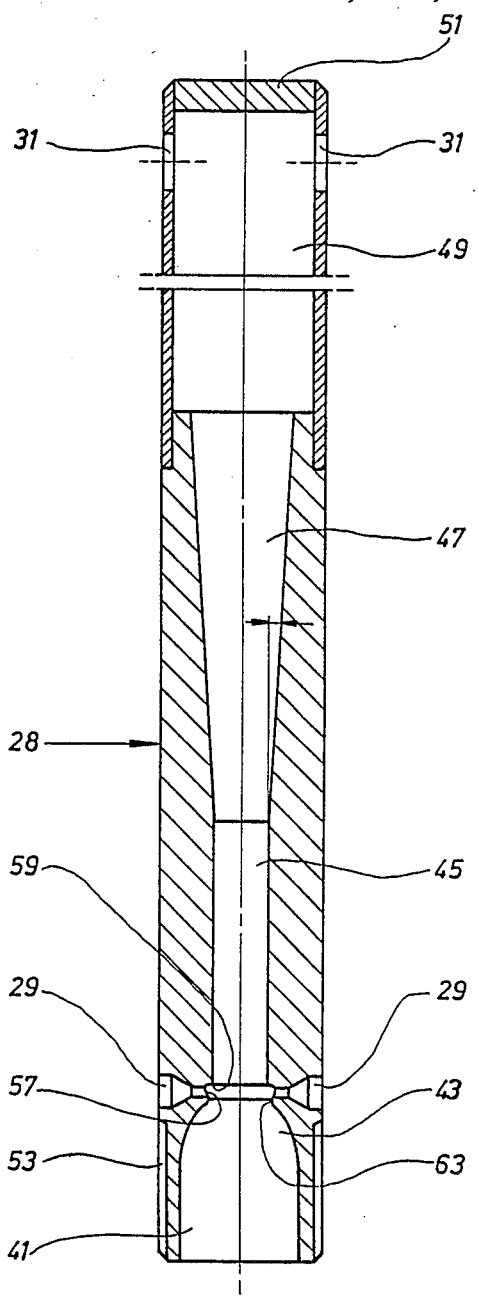
FIG. 10 is a sectional view in larger scale of a preferred venturi nozzle intended for use in cleansing apparatus according to the invention.

A preferred embodiment of a venturi nozzle for use with cleansing apparatus according to the invention is illustrated in FIG. 10. The venturi nozzle comprises an inlet part 41, a narrowing constriction 43, a cylindrical throat 45, a conically widened part 47 and a cover 51. Located beneath the cover 51 are laterally directed outlet openings 31. The venturi nozzle has at its lower end a screwthread connection 53 for fitting the nozzle to an upstanding connection pipe 55 on respective side pipes 26. Located between the constriction 43 and the throat is an annular groove 57 which has a sharp edge 59 facing the throat 45. The suction openings 29 discharge into said groove 57, wherewith the liquid entering the groove is able to distribute circumferentially therearound. The groove 57 suitably has an axial extension of 2-4 mm, and the groove edge 63 facing the constriction 43 has a radius which is 0.5-1 mm greater than the radius of the groove edge 59. The tangent to the wall of the constriction adjacent the groove edge 63 therewith passes externally of the groove edge 59. When gas passes through the venturi nozzle, liquid is sucked into the groove 57 and is torn loose upstream of or adjacent the sharp edge 59, in the form of fine liquid droplets. The contaminants in the gas are taken-up by these liquid droplets, during passage through the throat 25 45, the conically widened section 47 and the upper part 49. The device is thus a self-suction venturi separator. According to the invention, at least 0.5 kg, preferably 2-3 kg liquid, e.g. water, per $m^3$ of gas processed shall be drawn by suction through suction openings 29 and into the venturi nozzles 30. Consequently, the suction openings 29 and the grooves 57 are dimensioned such that the desired quantity of liquid will be sucked in at the given drop in pressure. The pressure drop is therewith determined by the difference in levels between the lower orifices 64 and the outlet orifices 31. A pressure drop of 1 m water-column or more is required in the majority of the cases in order to obtain satisfactory cleansing of the gas. It can be mentioned by way of example that 99% cleansing efficiency can be obtained in a venturi nozzle at a pressure drop of $10^4$ Pa, corresponding to 1 m water-column.

In the illustrated embodiment, the troat has a diameter of 10 mm and the upper part 49 a diameter of 26 mm. It has been found that in order to achieve a high degree of cleansing, the throat diameter should not exceed about 30 mm.

Figure 5:
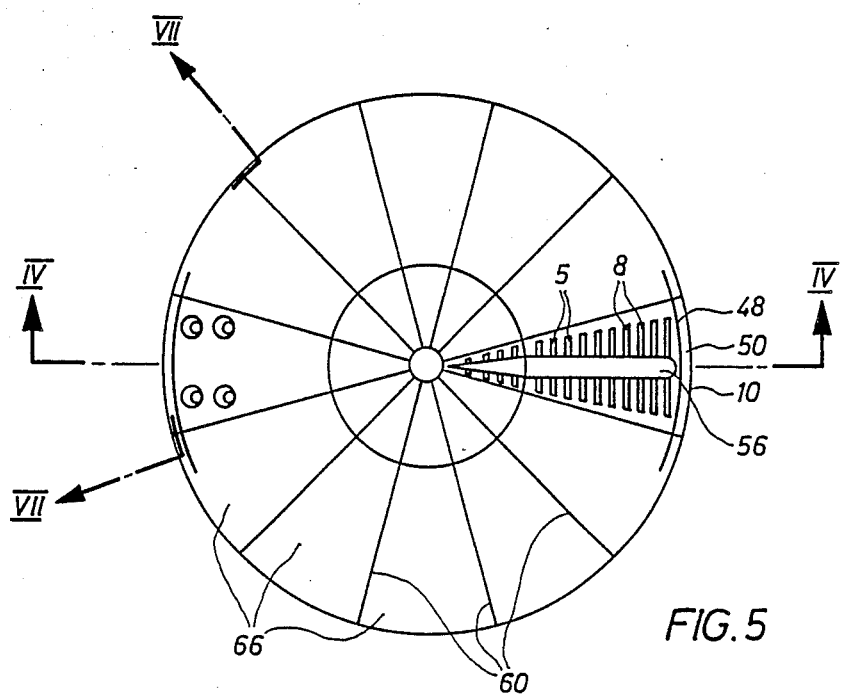
FIG. 5 is a horizontal sectional view taken on the line V—V in FIG. 4.

The embodiment illustrated in FIGS. 4 and 5 includes a modified distributing means 14' having a centrally located, cylindrical distribution chamber 52 and a plurality of distribution pipes 54 which extend obliquely upwards from the chamber 52 at mutually different levels. The distribution pipes 54 are provided with radially and inwardly directed parts 56 having horizontally and outwardly projecting distribution pipes 58. These distribution pipes 58 are provided with outlet nozzles 28, solely shown in one enlarged detail view, and may have located thereabove impinger or striking surfaces 30, as illustrated in FIGS. 1-3. In this case, the outlet nozzles 28 may have a shorter length, since the inlets 64 are located somewhat lower in the distribution chamber 52. The venturi nozzles, however, require a minimum length in order to provide an effective cleansing effect The gas cleansing apparatus illustrated in FIGS. 4 and 5 is divided into sections by means of radially extending partition walls 60, which are delimited upwardly by the intermediate bottom 36 and which extend down beneath the level of the outlet nozzles 28. The partition walls extend inwardly to the proximity of the inlet pipe 12, and outwardly to the proximity of the outer wall 10 of the apparatus. Arranged adjacent the outer wall is a circumferential guiding intermediate wall 48, the upper part of which extends above the surface 34 of the liquid bath when the bath is at rest, and the bottom part of which terminates adjacent the bottom 11 of the apparatus. The partition walls 60 may extend down into the slot-like space 50 and serve to steady the guiding intermediate wall 48. This arrangement, however, is not necessary for the function of the cleansing apparatus, and the intermediate wall 48 may instead be supported by stays connected to the outer wall 10.

The distributions pipes 54 present inlet orifices or gas intakes 64 in the wall of the distribution chamber 52 at mutually different height levels This enables the various cleansing sections to be brought into operation stepwise with increasing inlet pressures. Subsequent to exposure of a gas intake 64, due to the interior liquid surface 46 being pressed down to a lower level, the contaminated gas is able to flow up through the distribution pipe 54, 46 and out through the distribution pipes 58 and their respective outlet nozzles 28. Due to the height differential h between the liquid surface 46 and the distribution pipes 58, there will prevail an overpressure corresponding to the height difference in the outlet nozzles 28 The contaminated gas is thereby able to flow out with a pronounced pressure drop through the outlet nozzles 28, which guarantees a good cleansing effect and fine automization of the air into small bubbles. Because the gas intakes 64 are arranged at mutually different heights, it is possible, in this way, to activate automatically one section after another at part loads, with full cleansing effect. This is particularly important for achieving effective extraction of the dust present. The inertia effects are greatly dependent on gas speed, and a low gas speed will result in poor separation.

Because of the density reducing effect created by the gas bubbles, the actively working gas cleansing sections 66 will present a higher liquid level 34'. This liquid level 34' lies above the upper edge 68 of the guiding intermediate wall 48. This enables washing liquid to be recirculated from precisely those sections 66 which are actively working and to which contaminated gas is supplied. This prevents local concentration of contaminants and depletion of additives in the upper parts of the actively working sections, particularly at part loads.

Figure 6:
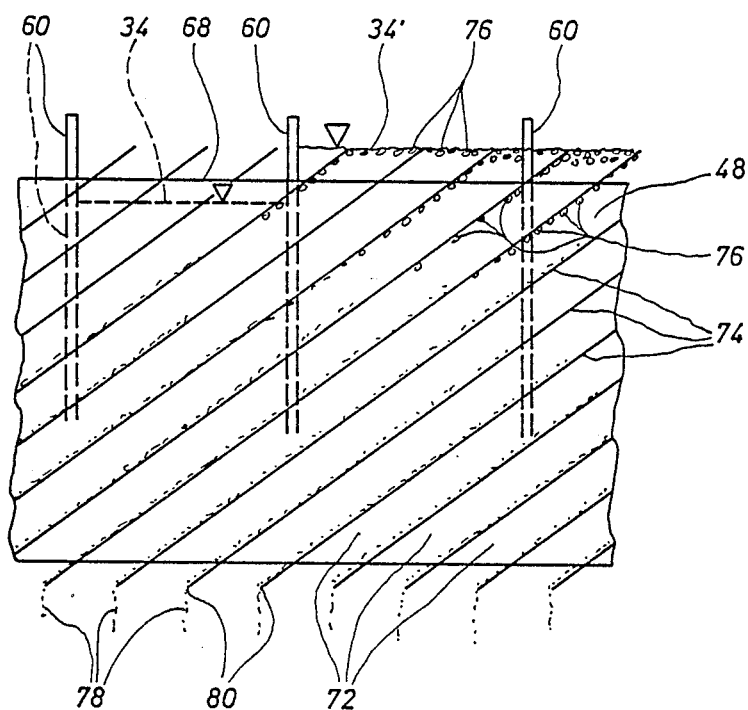
FIG. 6 is a detail view of a partition wall provided with inclined lamellae sedimentation plates for separating gas bubbles and particles from recirculating washing liquid.

FIG. 6 is a detail view of the slot-like space 50 having arranged therein inclined lamellae sedimentation plates 74. These plates 74 define a multiple of inclined spaces or chambers 72 which are defined upwardly and downwardly by said lamellae sedimentation plates 74. Gas bubbles 76 present in a volume of liquid introduced into such an inclined space will rise towards the upper defining plates, whereas particulate material will sink towards the bottom defining plate. The gas bubbles 76 then rise along the undersurface of the overlying plate, up to the liquid surface 34 or 34' respectively. The settling particles 78 slide down along the surface of the underlying plate, and finally fall to the bottom 11 of the vessel, from the bottom edge 80 of respective plates.

The use of lamellae sedimentation plates results in lateral displacement of recirculated liquid. This prevents liquid from being recirculated to the same cell or section at part loads, therewith counteracting depletion of the additive substances. A heat exchange coil (not shown) may be arranged in the vessel for cooling or, on special occasions, for heating the liquid in the gas cleansing apparatus.

The volumetric capacity of the vessel should be sufficiently large to accommodate the condensation formed and the solid particles extracted during active working of the apparatus during a breakdown in operations. When the apparatus is used for cleansing process gases, condensation and solid, extracted particles can be removed through the normally-closed bottom outlet 84 of the vessel, for instance through an arrangement of valves in which two valves are arranged one behind the other.

The impinger or striking surfaces may have any desired configuration. For example, they may comprise perforated plates arranged above the outlet orifices 31. Such a plate will also be effective in distributing the gas bubbles formed across the whole surface, thereby utilizing the available volume to a greater extent.

In the case of certain applications the vessel 1 may be freely open at the top. In this case, the side walls 10 must be sufficiently high to prevent the escape of liquid through splashing. Such a vessel may be provided with further separator means, such as grids or filters for separating liquid droplets and/or static or fluidised particle beds located above or beneath the surface of the liquid bath.

The guiding intermediate walls 48 may be placed at any desired location in the vessel 1 for isolation the slot-like spaces 50, for example adjacent the radial partition walls 60, or in pairs with interconnecting short walls. Conveniently, although not necessarily, the intermediate walls 48 are placed between different sections 66 or between parts served by different distribution pipes 18, 54.

The vessel 1 need not be circular, but may have any desired configuration, depending, for instance, on local conditions, and may be of rectangular or irregular configuration. Furthermore, the inlet pipe 12 may be connected to the vessel at any desired location thereon, for instance asymmetrically in the cover lid 13, or may pass through the side wall 10 of the vessel or through the bottom 11 thereof. It is important, however, that the inlet is connected to the distribution means 14 and 14' at a location above the highest gas intake 64.

The outlet openings 28 may be connected to respective associated gas intakes in the distribution means 14, 14' in any desired manner. In the majority of cases an arrangement which comprises horizontal or, for self-drainage purposes, slightly inclined distribution pipes 26, 58 and distribution pipes 18, 54, 56 affords the most suitable solution The outlet nozzles 28 can be made higher than illustrated in FIG. 4, in order to ensure that the liquid droplet sucked in through the suction openings 29 have sufficient distance to pass in order to be effective. It will be understood, however, that cleansing with the aid of a venturi effect can be dispensed with and solely the impinger action and washing-bottle effect relied upon.

A gas cleansing apparatus according to the invention may have any desired size and may include a multiple of mutually separate and mutually independent distribution means 14 and/or 14'. Furthermore, a gas cleansing plant may comprise a plurality of separate gas cleansing apparatus arranged in groups or at a distance from one another. This latter arrangement facilitates maintenance work, e.g. pipe work, and enables individual units to be placed out of action while retaining a state of readiness.

The gas cleansing apparatus according to the invention can thus be given very large dimensions. For example, in the case of an emergency system intended for nuclear power stations, the area may be as great as 50–100 m² and the diameter of the apparatus may be 10 m or larger. The initial liquid volume must also be chosen to allow for liquid losses. In the case of a gas release of the order of 10 kg/sec. at a temperature of 150° C., the water boiled-off is liable to be in the order of 1.0–3.5 m³/h. Additional liquid losses occur as a result of mist formations.

The invention is not restricted to the illustrated embodiments, and modifications can be made within the scope of the following claims. For example, the various part solutions illustrated in the drawings and/or described in the description can be combined in any desired manner when constructing a gas cleansing apparatus according to the invention.

We claim:

1. A method for cleansing gas from solid, liquid and/or gaseous contaminants, by bubbling the gas through a liquid bath (32), and by introducing the incoming gas into a distribution means (14,14') and causing the gas to pass in part-streams through a multiple of inlet orifices (64) located at progressively increasing depths beneath the surface (34, 34') of the liquid (32), the gas flow at increasing inlet pressures being caused to pass through an increasing number of inlet orifices (64) located at depths beneath the liquid surface (34, 34') which increase with corresponding inlet pressure, such that with increasing inlet pressure an increasing number of inlet orifices (64) are utilized for an increasing number of part-streams, such that at least substantially the same flow passes through the inlet orifices utilized irrespective of the inlet pressure and the total flow through the gas cleansing apparatus, characterized by passing the gas flow from respective inlet orifices (64) through connecting means (24,26,28; 54,56,28) to outlet orifices (31) located at a higher height level (h) than corresponding inlet orifices (64), and causing the gas flow to pass out into the liquid bath (32) at a pressure drop corresponding to the height differential (h) between respective outlet orifices (31) and an internal liquid surface (46) in said distributions means (14,14').

2. A method according to claim 1, characterized by constricting the gas flow during its passage through said connecting means, so as to generate high speed gradients, liquid being sucked into the nozzles through openings (29) provided in the walls of the said nozzles and facing the surrounding liquid bath (32).

3. A method according to claim 1, characterized by causing the gas part-streams upon exit into the liquid bath (32) to strike against means (impinger or striking surfaces 30) operative in splitting respective gas streams into fine bubbles, which are permitted to pass out through the liquid while delivering contaminants to said liquid.

4. Apparatus comprising a vessel (1) which is partially filled with a washing or cleansing liquid (32), an inlet (12) for contaminated gas, a distribution means (14, 14') which presents a multiple of inlet orifices (64) for the incoming contaminated gas at progressively increasing depths beneath the liquid surface (34,34'), and an outlet (16) for cleansed gas, the liquid surface or surfaces (46) in the interior of the distribution means (14,14') being pressed down with increasing inlet pressure such as to expose inlet orifices (64) progressively at increasing depths and permit gas to flow therethrough, characterized in that connecting means (24,26,28; 54,56,58,28) extend from respective inlet orifices (64) to outlet orifices (31) for part-streams of contaminated gas at higher height level (h) than corresponding inlet orifices (64) and beneath the surface (34,34') of the liquid.

5. Apparatus according to claim 4, characterized in that the distribution means (14,14') exhibits openings (22) towards the liquid bath (32) situated under the lowermost inlet orifice (64) intended for gas flow.

6. Apparatus according to claim 4, characterized in that a large number of outlet orifices (31) are arranged beneath substantially the whole of the liquid surface (34,34'), and that the height differential (h) between the outlet orifices (31) and respective corresponding inlet orifices (64) is approximately 1 mm or more, and that the outlet orifices (31) are located at a distance from the liquid surface (34) of at least 0.5 m, and that the major part of the outlet orifices (31) are located on one and the same level.

7. Apparatus according to claim 4, characterized in that the outlet orifices have the form of venturi nozzles which present openings (29) in the nozzle wall, which face the surrounding liquid bath (32).

8. Apparatus according to claim 4, characterized in that the vessel (1) is divided into sections by means of radially extending partition walls (60) which extend from a region beneath the outlet orifices (31) to a location above the gas-laden surface (34) of the liquid bath and above the intermediate bottom (36).

9. Apparatus according to claim 4, characterized in that at least one guiding intermediate wall (48) is arranged adjacent the outer wall (10) of the vessel (1) and define at least one slot-like space (50) through which liquid lifted by through-flowing gas can re-circulate down to the lower part of the vessel (1), and in that said guiding intermediate wall (48) extends to a location above the liquid surface (34) during conditions of rest, but not to the surface (34') of the gas-laden liquid, and in that the lower edge of the guiding intermediate wall (48) is located beneath the inlet orifices (28); and in that obliquely positioned lamellae sedimentation plates (74) are arranged in slot-like space (50).

10. Apparatus according to claim 4, characterized in that separator means for separating liquid droplets and any residual contaminants is arranged above the liquid surface (34,34'), in that the vessel is a closed vessel (1) and includes a cover or lid (13) having at least one outlet (16), in that an intermediate bottom (36) is arranged above the highest liquid surface (34')and isolates a chamber (44) upstream of the outlet (16), and in that the intermediate bottom (36) is provided with openings (38) provided with separation means (40) for separating fine liquid droplets and particles.

11. Apparatus according to claim 4 including at least one guiding intermediate wall arranged adjacent the radial partition wall to define at least one slot-like space through which liquid lifted by through-flowing gas can re-circulate down to the lower part of the vessel, said guiding intermediate wall extending to a location above the liquid surface during conditions of rest, but not to the surface of the gas-laden liquid, and to a location beneath the inlet orifices; and including obliquely positioned lamellae sedimentation plates arranged in said slot-like space.

12. Apparatus according to claim 4, including guiding intermediate walls arranged in pairs opposite one another to define at least one slot-like space through which liquid lifted by through-flowing gas can re-circulate down to the lower part of the vessel, said guiding intermediate walls extending to a location above the liquid surface during conditions of rest, but not to the surface of the gas-laden liquid, and to a location beneath the inlet orifices; and including obliquely positioned lamellae sedimentation plates arranged in said slot-like space.

13. Apparatus according to claim 12 wherein said separation means comprises cyclones having an extension pipe extending down and terminating in a bottom outlet to beneath the liquid orifice.

* * * * *